“Ziegler-type” catalysts. These catalysts usually employ a titanium or vanadium halide with an organometallic compound of Groups I–III of the Periodic Table, most usually an organoaluminum compound. An illustrative catalyst is titanium trichloride AA and triisobutyl aluminum. The polymerization is usually carried out at temperatures in the range of from about 20° to 150° C. Preferably, an inert solvent is used, such as a hydrocarbon solvent. The molecular weight of the product is controlled by various methods known in the art, such as introduction of hydrogen, phenols, polyethers, etc.

3,322,672
CHLORINATED POLYMERS AS V.I. IMPROVERS
Garth M. Stanton, Pinole, Calif., assignor to Chevron Research Company, a corporation of Delaware
No Drawing. Filed Apr. 6, 1965, Ser. No. 446,080
5 Claims. (Cl. 252—58)

This invention concerns novel lubricating oil compositions having improved viscosity index. More particularly, this invention concerns novel lubricating oil compositions with improved viscosity indexes containing chlorinated copolymers of $C_2$ to $C_4$ olefins.

Uncompounded lubricating oils generally do not have a desirable temperature viscosity relationship for use in internal combustion engines. A satisfactory lubricating oil must not be too viscous at the lower range of temperatures at which it is used and must not be too thin or fluid at the upper range of temperatures at which it is used. One method for varying the viscosity temperature relationship of the oil is to introduce into the oil, what has become commonly known as viscosity index improvers. The viscosity index improvers have been for the most part polymers. An acceptable viscosity index improving polymer must be soluble in the oil, have good thickening power and viscosity index blending characteristics, and should have good shear stability, shear dependence on thickening power and chemical and thermal stability.

Pursuant to this invention, viscosity index improvers are provided which are comprised of hydrocarbon copolymers of $C_2$–$C_4$ olefins, preferably propene and butene-1, of a molecular weight in the range of 100,000 to 500,000 and chlorinated to from 10 to 17 weight percent. By chlorinating the hydrocarbon copolymers, significant enhancement of viscosity index is obtained.

The chlorinated polymeric compositions of this invention are $C_2$–$C_4$ (ethylene, propylene and butene-1) copolymers (2 monomers) having from 25 to 75 mole percent of any one monomer and of molecular weight in the range from about 100,000 to 500,000, more usually 200,000 to 300,000, having from 10 to 17, desirably 13 to 16, and preferably 15 weight percent chlorine.

The chlorinated polymers are conveniently prepared by preforming a hydrocarbon polymer and then chlorinating the preformed polymer to the desired extent. The hydrocarbon polymer is conveniently prepared with "Ziegler-type" catalysts. These catalysts usually employ a titanium or vanadium halide with an organometallic compound of Groups I–III of the Periodic Table, most usually an organoaluminum compound. An illustrative catalyst is titanium trichloride AA and triisobutyl aluminum. The polymerization is usually carried out at temperatures in the range of from about 20° to 150° C. Preferably, an inert solvent is used, such as a hydrocarbon solvent. The molecular weight of the product is controlled by various methods known in the art, such as introduction of hydrogen, phenols, polyethers, etc.

The hydrocarbon polymer is then conveniently dissolved in an inert solvent, generally an inert aromatic hydrocarbon, e.g., benzene, halohydrocarbon or halocarbon solvent and contacted with chlorine in the presence of light or other free radical catalysts. The temperature of the reaction is generally in the range of about 0 to 50° C. The concentration of the polymer in the solvent will usually range from about 1 to 25 weight percent. The method of chlorination is not critical to this invention, and any method which retains the molecular weight of the hydrocarbon polymer or degrades the hydrocarbon polymer to the desired molecular weight during chlorination is satisfactory.

The chlorinated copolymers can be incorporated with a variety of lubricating oils by simply blending with stirring at ordinary temperatures, of, if desired, by mixing the lubricating oil and chlorinated copolymer at elevated temperatures, e.g., 100–130° C., with agitation.

The concentration of the chlorinated copolymer when used as a viscosity index improver will normally be not less than 0.1%, nor exceed 15 weight percent, of the oil. However, concentrates containing high percentages, that is in the range of about 25 to 40 weight percent of the chlorinated copolymer in the lubricating oil may be made for convenience in handling and distribution.

The base oil in the lubricant composition of this invention is any oil of lubricating viscosity in which the chlorinated propene/butene copolymer is soluble. Thus, the base oil can be a refined paraffin-type base oil, a refined naphthenic-type base oil, or a synthetic hydrocarbon or synthetic nonhydrocarbon oil of lubricating viscosity. As synthetic oils, illustrative examples include oils obtained by polymerization of low molecular weight alkylene oxides, such as propylene oxide and/or ethylene oxide; esters of both inorganic and organic acids, e.g., carboxylates and silicates. For present purposes, the petroleum derived mineral lubricating oils are preferred, since they show the greatest viscosity and stability improvement.

Lubricant compositions within the scope of the present invention may also contain still other additives of conventional types, such as pour point depressants, oiliness and extreme pressure agents, antioxidants, and the like. The viscosity index improvers of this invention are found to be compatible with a variety of detergents, particularly the ashless detergents which comprise a long hydrocarbon chain joined to a polyamine by an acyl group. Illustrative of such detergents are alkenyl succinimide of polyalkylene polyamines, N-hydrocarbyl N′-polyalkylene polyamine ureas, hydrocarbyl sulfonamides of polyalkylene polyamines, etc.

The characteristics of the lubricating oil were evaluated by means of viscosity index (V.I.) and shear breakdown resistance. Lubricating oil compositions having a low rate of change of viscosity with temperature are highly desirable. Judgment of the suitability of a lubricating oil composition for use over a wide range of operating temperatures is afforded by the V.I. of the oil which is calculated from the measured viscosities of the lubricating composition at 100° and 210° F. by the standard ASTM Method D567–41. In this test, lubricating compositions exhibiting the highest V.I. show the least change in viscosity with change in temperature. In the data to follow, the polymer is generally blended at 2.8 weight percent in various neurtla oils.

The shear stability of the oil solution is determined by measuring the percent viscosity loss after a given time according to a standard shear strength determination. This method is described in ASTM Standards On Petroleum Products, vol. I, 1961, page 1160.

The following examples are offered by way of illustration and not by way of limitation.

*Example 1—Exemplary preparation of chlorinated propene/butene copolymer*

Into a 1-liter flask was introduced a 7 weight percent solution of a 50:50 mole ratio propene/butene copolymer (average molecular weight=200,000), the solution irradiated with ultraviolet light, and chlorine rapidly introduced into the solution over a period of 2 hours. The resulting polymeric product was then isolated and analyzed, showing 11.3 weight percent chlorine.

*Example A—Preparation of propene/butene copolymer*

Into a 10-gallon kettle was introduced 7 gals. of dry benzene, 45 g. of $TiCL_3$ AA (aluminum activated) and 51 g. of triisobutyl aluminum at a temperature of 170° F. and the system pressurized to 18 p.s.i.g. hydrogen. While maintaining the temperature, 2262 g. of propylene and 2092 g. 1-butene were added simultaneously over a period of 70 minutes. The hydrogen plus feed pressure varied from 15 to 20 p.s.i.g. At the end of the addition, the system was cooled to 120° F. and 2 liters methanol added, precipitating the polymer which was isolated and dried. The average molecular weight of the polymer was 250,000.

Following the procedures of Example A and Example 1, a variety of chlorinated propene/butene copolymers were prepared. The viscosity index of the polymers was determined and some samples were tested for shear. The following table indicates the results.

TABLE

| | Polymer $C_3/C_4$, Mole Ratio | Polymer $V_{210}$ (Prior to Chlorination) | Chlorine, Wt. Percent | $V_{210}°$ F. | V.I.[1] | Acryloid 710/ Shear Sample/ Acryloid 763 |
|---|---|---|---|---|---|---|
| 1 | 1/1 | 76 | 11.3 | 73 | 140.6 | |
| 2 | 1/3 | 130 | 14.1 | 115 | 139 | 25.7/33.8/34.7 |
| 3 | 1/3 | 100 | 17.4 | 93.3 | 141.5 | 21.4/35.5/31.6 |
| 4 | 1/3 | 69.9 | 16.9 | 64.7 | 137.5 | 21.9/18.8/34.8 |
| 5 | 1/3 | 69.9 | 16.2 | | | 19.5/16.4/33.0 |
| 6 | 3/2 | 71.4 | 10.8 | 62.3 | 134.0 | |
| 7 | 1/3 | 69.9 | 13.9 | 63.9 | 136.5 | |
| 8 | 1/3 | 69.9 | 15.9 | 64.8 | 136.5 | |
| 9 | | | [2] 16.2+13.9 | 63.4 | 137.0 | |

[1] 2.8 weight percent in 130 Neutral Oil.
[2] Combined the polymers of Examples 5 and 7 in 5 to 1 weight proportions.

It is evident from the above Table that the polymers provide good viscosity index improvement, while being quite stable under extreme shear conditions. Moreover, all of the polymers tested above were found to be compatible with the oil at the concentrations used, none of the polymers separating or hazing.

To further determine the usefulness of the chlorinated copolymers as viscosity index improvers, compounds of oil compositions were prepared employing the chlorinated copolymers and tested in two different engine tests. The first test was a modified standard FL-2 test procedure as described in the June 21, 1948 report of the Coordinating Research Council. A standard procedure requires the maintenance of a jacket temperature of 95° F. and crankcase oil temperature of 155° F. at 2500 r.p.m. and 45-brake H.P. for 40 hours (closely simulating the relatively "cold" engine conditions which are normally experienced in city driving). At the end of each test, the engine is dismantled and the amount of sludge (rating of 0 to 50, no sludge being 50) and clogging of the rings and oil screen (rate is from 0 to 100, 0 being no clogging) is determined.

The above test was modified by carrying out the test for 80 hours and periodically raising the oil sump temperature from 165° to 205° F. and the water jacket temperature from 95° to 170° F.

The composition used in the FL-2 engine test comprised 125 g. of the polymer of Example 4, 750 g. of 480 Neutral oil, 3850 g. of 130 Neutral oil, 187 g. of the polyisobutenyl succinimide of tetraethylene pentamine (~1000 molecular weight), 16 g. of a corrosion inhibitor and 71 g. of a zinc di(alkyl) dithiophosphate (alkyl of from 4 to 6 carbon atoms). $V_{210}=70.4$; V.I.$=131$.

The total varnish and sludge rating was 58.5 and oil ring clogging was 0, indicating excellent engine cleanliness, thus demonstrating that the chlorinated copolymers of this invention, while providing good viscosity index improvements are compatible with the other oil additives and do not create deposits under operating conditions.

Also used was the L-1 Supplement 1 conditions (MIL-L-2-1048, Supp. 1) as described in the Coordinating Research Council Handbook, January 1946.

The composition used in the L-1, Supp. 1 test combined 146 g. of the polymer of Example 9 with 41 g. of the polymer of Example 8 in 6680 g. of 130 Neutral oil, added 354 g. of 480 Neutral oil, 80 g. of zinc di(alkyl)dithiophosphate (alkyl of from 4 to 6 carbon atoms), and 188 g. of polyisobutenyl succinimide of tetraethylene pentamine (molecular weight ~1000). $V_{210}=64.5$; V.I.$=133.5$.

The engine results were: for the groove deposits, 9-0-0-0; for the piston deposits, 0-0-0. (Groove deposits are rated 0 for clean and 100 for completely black; piston land deposits are rated as 0 for clean grooves, and 800 for completely black lands.)

The above results demonstrate that the viscosity index improvers of this invention do not in any wise interfere with the normal operation of the engine, while providing improved lubrication resulting from the superior viscosity temperature relationship. Moreover, the chlorinated copolymers impart to the oil the desired characteristics of a multigrade oil, providing easier starting and good lubrication over a wide temperature range.

As will be evident to those skilled in the art, various modifications on this invention can be made or followed, in the light of the foregoing disclosure and discussion, without departing from the spirit or scope of the disclosure or from the scope of the following claims.

I claim:
1. A lubricating oil composition having in an amount sufficient to provide viscosity index improvement, a copolymer of propylene and 1-butene, wherein said copolymer is characterized by being prepared using a catalyst comprising in combination a titanium or vanadium halide with an organoaluminum compound, having a molecular weight in the range of 100,000 to 500,000, having the mole percent of any one olefin in said copolymer in an amount not to exceed 75, and having chlorine in an amount of from 10 to 17 weight percent.

2. A composition according to claim 1, wherein said polymer has chlorine in an amount of from 13 to 16 weight percent.

3. A composition according to claim 1, wherein said polymer has a molecular weight in the range of 200,000 to 300,000, said chlorine is present in an amount of from 13 to 16 weight percent.

4. A composition according to claim 3, wherein said propene/butene copolymer has about 15 weight percent chlorine.

5. A composition according to claim 3, wherein said lubricating oil is hydrocarbon and said propene/butene copolymer has about 15 weight percent chlorine.

References Cited

UNITED STATES PATENTS

| 2,181,144 | 11/1939 | Morway et al. | 252—58 X |
| 2,213,331 | 9/1940 | Arveson | 252—58 X |
| 2,225,318 | 12/1940 | Morway et al. | 252—58 X |
| 2,298,833 | 10/1942 | Muessig | 252—58 |
| 3,081,294 | 3/1963 | Beynon et al. | 252—58 X |
| 3,175,972 | 3/1965 | Mitacek | 252—58 X |

FOREIGN PATENTS 696,960  9/1953  Great Britain.

DANIEL E. WYMAN, Primary Examiner.

W. H. CANNON, Assistant Examiner.